US 8,156,340 B1

(12) United States Patent
Marballi

(10) Patent No.: US 8,156,340 B1
(45) Date of Patent: Apr. 10, 2012

(54) SYSTEM AND METHOD FOR SECURING SYSTEM CONTENT BY AUTOMATED DEVICE AUTHENTICATION

(75) Inventor: Gaurav K. Marballi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 213 days.

(21) Appl. No.: 12/276,566

(22) Filed: Nov. 24, 2008

Related U.S. Application Data

(63) Continuation of application No. 10/897,860, filed on Jul. 23, 2004, now Pat. No. 7,480,803.

(51) Int. Cl.
G06F 7/04 (2006.01)
(52) U.S. Cl. .......................... 713/178; 726/29
(58) Field of Classification Search .................. 713/178; 726/29
See application file for complete search history.

(56) References Cited

U.S. PATENT DOCUMENTS

| | | | |
|---|---|---|---|
| 5,889,865 A | 3/1999 | Vanstone et al. | |
| 5,905,859 A | 5/1999 | Holloway et al. | |
| 6,163,771 A | 12/2000 | Walker et al. | |
| 6,721,578 B2 | 4/2004 | Minear et al. | |
| 6,829,356 B1 | 12/2004 | Ford | |
| 6,978,023 B2 | 12/2005 | Dacosta | |
| 6,986,046 B1 * | 1/2006 | Tuvell et al. ................ | 713/171 |
| 7,480,803 B1 | 1/2009 | Marballi | |
| 2003/0065918 A1 | 4/2003 | Willey | |
| 2003/0067921 A1 | 4/2003 | Sivalingham | |
| 2003/0114144 A1 | 6/2003 | Minemura | |
| 2004/0097217 A1 | 5/2004 | McClain | |
| 2004/0117619 A1 | 6/2004 | Singer et al. | |
| 2005/0135388 A1 * | 6/2005 | Hartikainen et al. ......... | 370/401 |
| 2006/0161772 A1 * | 7/2006 | Talstra et al. ................ | 713/168 |
| 2009/0144811 A1 * | 6/2009 | Matsubara et al. .............. | 726/5 |

OTHER PUBLICATIONS

Gong, Li, "Variations on the Themes of Message Freshness and Replay—or the Difficulty in Devising Formal Methods to Analyze Cryptographic Protocols," SRI International, Computer Science Laboratory, IEEE 1993, pp. 131-136.
Urbanek, Robert E., et al., "Enhanced Storage and Delivery of Bundled Content Employing Device-Client," U.S. Appl. No. 10/897,843, filed Jul. 23, 2004.
Office Action dated Jan. 8, 2008, 7 pages, U.S. Appl. No. 10/897,860, filed Jul. 23, 2004.
Final Office Action dated Jul. 9, 2008, 11 pages, U.S. Appl. No. 10/897,860, filed Jul. 23, 2004.
Notice of Allowance and Fees Due dated Sep. 16, 2008, 9 pages, U.S. Appl. No. 10/897,860, filed Jul. 23, 2004.
Supplemental Notice of Allowability dated Oct. 8, 2008, 5 pages, U.S. Appl. No. 10/897,860, filed Jul. 23, 2004.
Corrected Supplemental Notice of Allowability dated Nov. 4, 2008, 2 pages, U.S. Appl. No. 10/897,860, filed Jul. 23, 2004.

* cited by examiner

*Primary Examiner* — Christopher Brown

(57) ABSTRACT

A system is provided for securely downloading content to a mobile telecommunications device. The system includes a mobile application to enable the mobile telecommunications device to send a request for content identified on a telecommunication provider system. The system includes a content application maintained by the content provider to retrieve content and promote delivery of the content to the mobile telecommunications device. The system also includes a challenge component and a response component, the response component communicates with the mobile application and encodes a challenge data. The challenge component communicates with the content application. The challenge component sends the challenge data to the mobile application and decodes the challenge data received from the mobile application to validate the response for delivery of the content to the mobile application.

14 Claims, 2 Drawing Sheets

SYSTEM AND METHOD FOR SECURING SYSTEM CONTENT BY AUTOMATED DEVICE AUTHENTICATION

CROSS-REFERENCE TO RELATED APPLICATIONS

This application is a continuation of and claims priority to U.S. patent application Ser. No. 10/897,860, entitled "System and Method for Securing System Content by Automated Device Authentication", filed on Jul. 23, 2004, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the downloading of content for mobile telecommunications devices. More particularly, embodiments of the present invention provide for the authentication of users who attempt to download content.

BACKGROUND OF THE INVENTION

Users of mobile telecommunications devices can download content for their devices such as ring tones, screen savers, games, and other applications. These items might reside on computing equipment maintained by a provider of the telecommunications service. Alternatively, the telecommunications provider might wish to make content provided by third parties available to its customers. As used herein, the term 'content provider' can refer to either a telecommunications provider providing its own content or a third party making its content available to customers of a telecommunications provider.

Under current procedures for a content provider making content available to customers, the content provider might load the content into a content catalog, such as an electronic media application for presenting the offerings of the provider. The catalog would be accessible to customers through their mobile telecommunications devices so that customers could download content from the catalog to their mobile telecommunications devices (also known as handsets).

A content provider might wish to restrict access to its content so that only legitimate customers are allowed to download content. Therefore, it might be desirable to authenticate customers who attempt to download content to ensure that the customers are allowed to receive the content. Many commercially available authentication systems, such as public key infrastructure (PKI), require a great deal of computing capacity and memory. Such systems typically cannot be efficiently implemented on mobile telecommunications devices where computing capacity and memory might be limited.

SUMMARY OF THE INVENTION

According to one embodiment, a system is provided for securely downloading content to a mobile telecommunications device. The system includes a mobile application to enable the mobile telecommunications device to send a request for content identified on a telecommunication provider system. The system includes a content application maintained by the content provider to retrieve content and promote delivery of the content to the mobile telecommunications device. The system also includes a challenge component and a response component, the response component communicates with the mobile application and encodes a challenge data. The challenge component communicates with the content application. The challenge component sends the challenge data to the mobile application and decodes the challenge data received from the mobile application to validate the response for delivery of the content to the mobile application According to another embodiment, a method is provided for authentication of a requesting entity by an authenticating entity to download content. The method includes downloading, from a telecommunication provider system by a portable device, an application in response to identifying content to download to the portable device. The method includes sending a request for content from the portable device to a content provider system. The content provider system maintains the content to download to the portable device. The method includes obtaining, by the content provider system, challenge data, and communicating the challenge data to the portable device. The method also includes encoding, by the portable device, the challenge data, and receiving the encoded challenge data by the content provider system. The method also includes decoding the challenge data to validate the portable device.

In another embodiment, the present disclosure provides a method for authentication of a requesting entity by an authenticating entity. The method includes the requesting entity sending to the authenticating entity a request for data. The authenticating entity retrieves a time data based on a current time of a system of the authenticating entity. The authenticating entity sends the retrieved time data to the requesting entity. The method also includes the requesting entity returning the retrieved time to the authenticating entity. The authenticating entity determines a received time and calculates a time difference between the retrieved time data and the received time when the retrieved time is received by the authenticating entity. The method also includes when the time difference is less than a predetermined threshold, the authenticating entity accepts the requesting entity as authentic.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
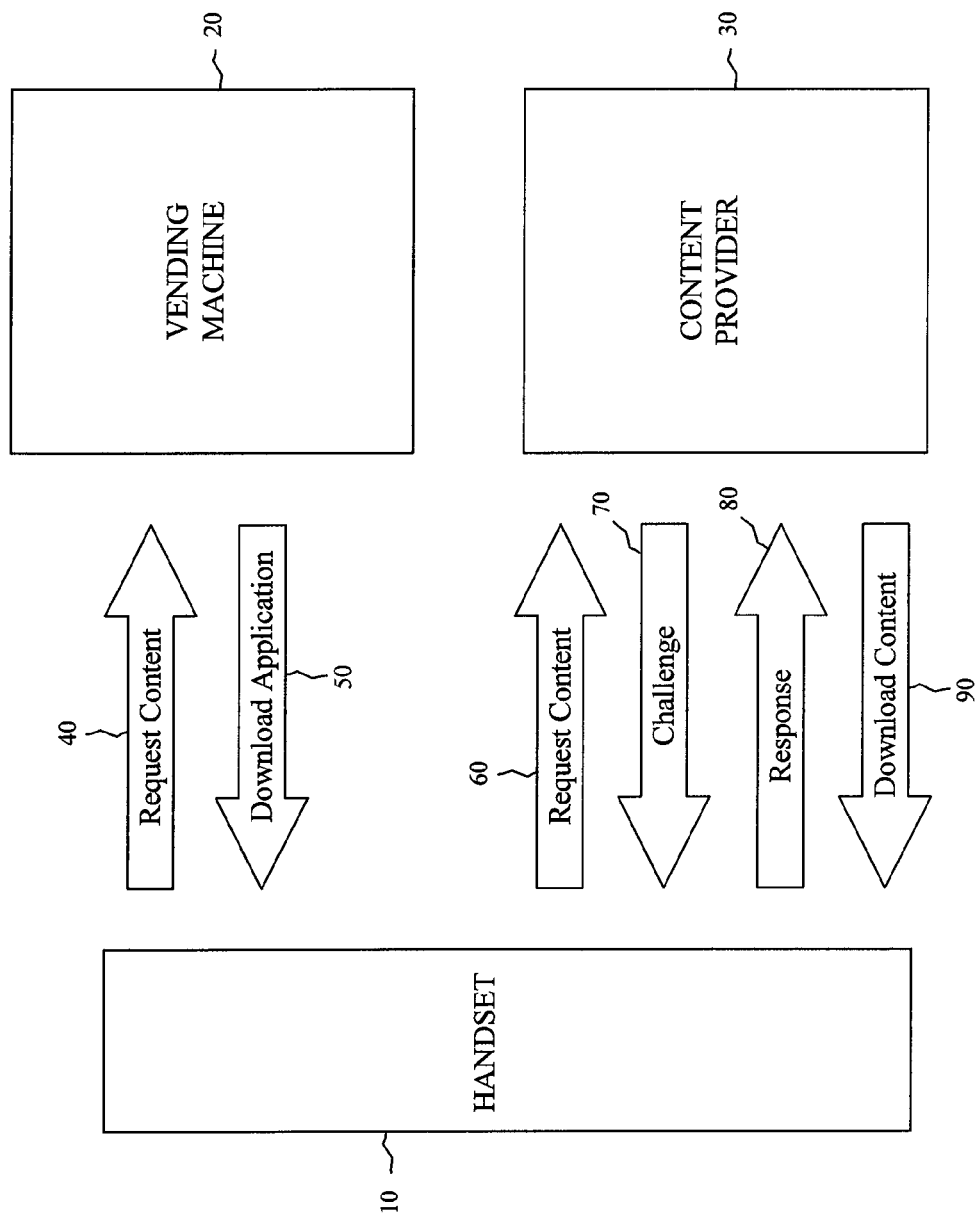
FIG. 1 is a block diagram of a system for securely downloading content to a mobile telecommunications device.

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present invention allow a content provider to authenticate a user who attempts to download content to a handset. Authentication is achieved through a challenge and response protocol that consumes only a minimal amount of computing capacity and memory and is therefore suitable for mobile telecommunications devices. Since mobile telecommunications devices typically do not have sophisticated session management capabilities, this technique provides a lightweight procedure for preventing unauthorized downloads. Standard network sign-on protocols are used to authenticate the handset and the user prior to any attempts to download content. The procedures described herein are a secondary authentication to prevent, for example but not limited to, an unauthorized user from obtaining content or gaining access by pretending to be an authorized user.

In an embodiment, when a user requests content to be downloaded, an application that manages communication with a content provider may be downloaded to the user's handset. In one embodiment, the application is a J2ME application but in other embodiments other types of applications appropriate for mobile telecommunications devices could be used. The application contains a key that can be used to encrypt and decrypt communications with the content provider. The content provider has the same key so that the content provider can encrypt and decrypt messages to and from the J2ME application. The specific key that is included with the application is also provided to the content provider. Periodically newly downloaded applications may be provided with new keys and the new key would also be provided to the content provider. In this manner, the keys change periodically for added security.

A single key, code, string or passkey, may be used for all applications and content providers, or each content provider and corresponding application may use a different key, or other combinations may be used. It will be appreciated that a number of other techniques for generating, managing, handling, and passing keys, as well as encrypting and decrypting the keys may be used and are well known to those skilled in the art. These techniques include public key encryption/decryption, but some techniques may require less robust systems which may be preferable for some embodiments of the present disclosure. For example, the key may be a hard-coded string or set of information and may use private key encryption/decryption systems, one-time pads, or encryption techniques such as, but not limited to, XORing the data string.

After being downloaded to the handset, the J2ME application sends a request for the selected content to the content provider. The content provider then uses a challenge and response procedure to establish the authenticity of the user. A valid response by the J2ME application to the content provider's challenge indicates that the handset on which the J2ME application resides is legitimate.

In an embodiment, when a server hosted by the content provider receives the request for content, the server retrieves the current time from its internal clock. The server then sends the time to the J2ME application in the handset as the authentication challenge. Upon receiving the time, the J2ME application uses its key to encrypt the time. The J2ME application then returns the encrypted time to the server as its response to the challenge. The server attempts to decrypt the time using its key, which, if the request for content is legitimate, is the same as the key used by the J2ME application to encrypt the time. Successful decryption of the time by the server indicates that the correct key was used to encrypt the time. In such a case, the handset passes a first authentication step.

Given enough time and computing capacity, an unauthorized user might be able to discover the key that is used to encrypt and decrypt messages between a handset and a content provider. Such a user might then use the key to download content without compensation to the content provider. To prevent this, an additional authentication step can be taken to further ensure the authenticity of a handset. The server hosted by the content provider can compare the time it sends as a challenge to the handset to the time when it receives the encrypted time back from the handset.

The passage of an extended period of time between the sending of the challenge and the receipt of the response may allow an unauthorized user enough time to discover the encryption key by brute force code-breaking methods. To prevent such a breaking of the code, a response can be considered invalid if it is not returned within a predefined period of time. The handset is determined to be illegitimate in such a case and it is not allowed access to the requested content. If only a small amount of time passes between the sending of the challenge and the receipt of the response, it is assumed that there was not enough time to break the code. The handset is then determined to be authentic and it is allowed access to the requested content.

In one embodiment, the same key is used for all handsets serviced by a telecommunications provider. In other embodiments, each third-party content provider uses a different key.

In the above discussion, the content provider sends a time in an unencrypted message to the J2ME application and the J2ME application returns the time in an encrypted form to the content provider. One of skill in the art will recognize that the reverse situation could also be implemented. That is, the content provider can encrypt the time using its key and send the encrypted time to the J2ME application. The J2ME application could then decrypt the time using its key and return the decrypted time to the content provider. A request for content could be considered valid if the J2ME application is able to successfully decrypt the time.

In addition, while the above discussion has focused on the downloading of content to mobile telecommunications devices, one of skill in the art will recognize that this authentication protocol could be used in other settings where a lightweight authentication protocol is desired. That is, the system and method of encrypting and decrypting a time and denying authentication if the encryption or decryption does not occur successfully within a predetermined period of time consumes very little computing capacity and memory and is therefore applicable in numerous situations where more cumbersome authentication protocols are inappropriate.

FIG. 1 illustrates an embodiment of a system by which content can be securely downloaded to a mobile telecommunications device. The mobile telecommunications device, or handset 10, is used to request content via path 40. The request is typically sent to a content catalog, which is referred to as a content vending machine 20 in FIG. 1. As described above, a J2ME application designed to retrieve content can reside in the vending machine 20. The vending machine 20 returns the J2ME application to the handset 10 via path 50. In other embodiments, the J2ME application may be resident on the handset 10 and may not need to be downloaded.

The J2ME application, which is now resident on the handset 10, sends a request for the selected content to a content provider 30 via path 60. The content provider 30 might be the telecommunications provider that provides service to the handset 10 or might be a third party. The request for content contains the file name of the requested content, which is typically maintained in a secure file system hosted by the content provider. Upon receipt of the request, a server side application hosted by the content provider 30 attempts to verify the authenticity of the J2ME application making the request.

To do so, the server side application retrieves, for example, its internal clock time and sends the time, via path 70, to the J2ME application on the handset 10. This constitutes a security challenge to the handset 10. The J2ME application encrypts the time using an encryption key that was downloaded with the J2ME application and returns the encrypted response, via path 80, to the server side application. The server side application then attempts to decrypt the response. Successful decryption in a short period of time indicates that the J2ME application has a legitimate key and that it is unlikely that an unauthorized user would have had sufficient time to discover the key by illicit means. In such a case, the handset 10 is considered authentic.

Upon authentication of the handset 10, the server side application performs a direct file system lookup within its local file system for the requested file. When the requested file is found, the server side application downloads the requested content to the handset 10 via path 90.

Figure 2:
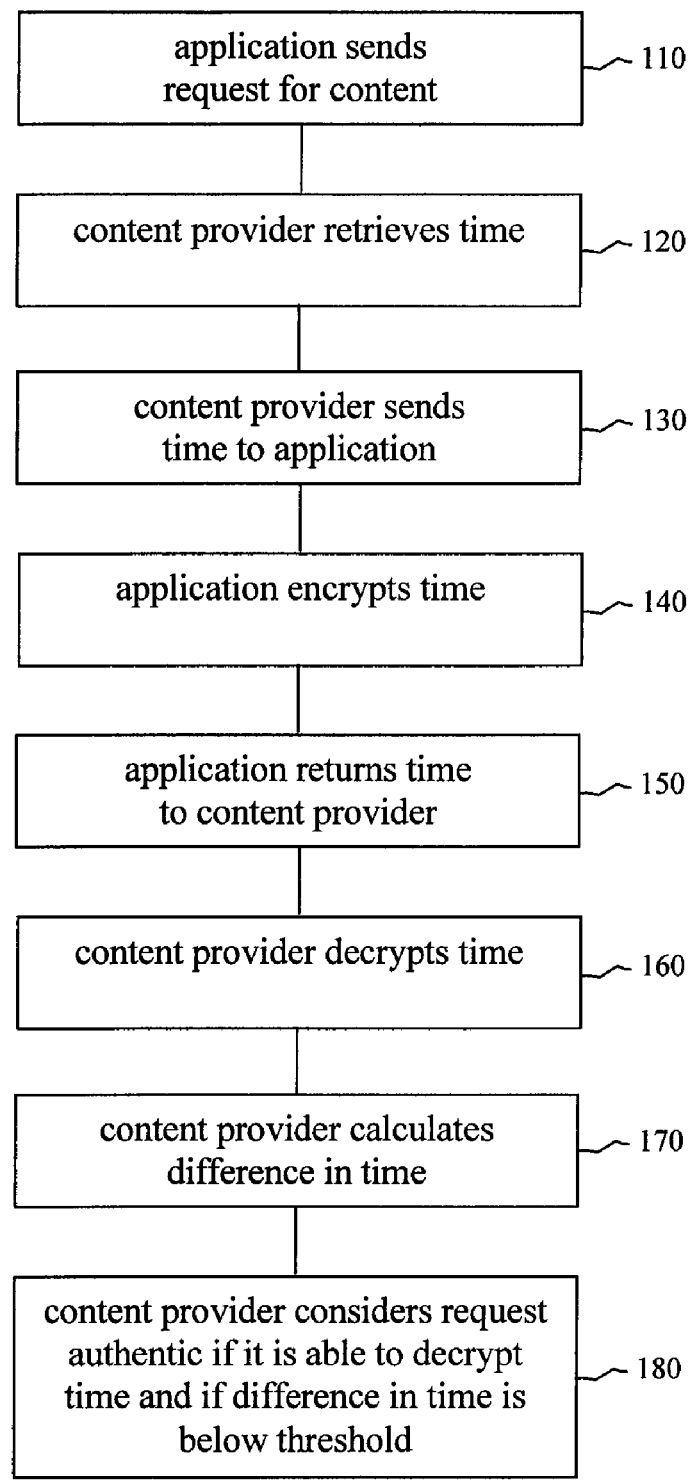
FIG. 2 is a flowchart of a method for securely downloading content to a mobile telecommunications device.

An embodiment of a method by which content can be securely downloaded to a mobile telecommunications device is illustrated in FIG. 2. In box 110, an application sends a request for content to a content provider. In box 120, the content provider retrieves its internal time. The content provider sends the time to the application in box 130. In box 140, the application encrypts the time. The application then returns the encrypted time to the content provider in box 150. The content provider decrypts the time in box 160 and, in box 170, calculates the difference between the retrieved time and the time that the retrieved time was returned from the application. In box 180, the content provider considers the request authentic if it is able to decrypt the time and if the difference in time is below a predetermined threshold.

While several embodiments have been provided in the present disclosure, it should be understood that the System and Method for Securing System Content by Automated Device Authentication may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A method for authentication of a requesting entity by an authenticating entity comprising:

receiving, by an authenticating entity, a request for data from a requesting entity; and sending, by the authenticating entity, challenge data to the requesting entity;

receiving, by the authenticating entity, the challenge data from the requesting entity;

wherein the challenge data is encrypted, by a computer processor, in one direction between the authenticating entity and the requesting entity, and the challenge data is sent in plain text in the other direction between the authenticating entity and the requesting entity;

wherein the challenge data comprises time data based on a current time of a system of the authenticating entity;

wherein the authenticating entity determines a received time of the received challenge data and calculates, by a computer processor, a time difference between the time data and the received time when the challenge data is received from the requesting entity; and authenticating, by the authenticating entity, the requesting entity by comparing the challenge data sent to the requesting entity and the challenge data received from the requesting entity, and determining that the time difference is less than a predetermined threshold, wherein when the requesting entity requests data, the authenticating entity provides an application and a key for download by the requesting entity, and wherein the challenge data is encrypted by the requesting entity or the authenticating entity and decrypted by the authenticating entity or the requesting entity using the key.

2. The method of claim 1, wherein the challenge data sent by the authenticating entity is encrypted and the challenge data received from the requesting entity is decrypted.

3. The method of claim 2, wherein the challenge data received from the requesting entity is in plain text.

4. The method of claim 1, wherein the challenge data received from the requesting entity is encrypted and the authenticating entity decrypts the encrypted challenge data.

5. The method of claim 4, wherein the authenticating entity sends the challenge data to the requesting entity in plain text.

6. The method of claim 1, wherein the requesting entity is a mobile telecommunications device requesting content to be downloaded.

7. The method of claim 6, wherein the authenticating entity is a content provider maintaining content to be downloaded to the mobile telecommunications device.

8. A method for authentication of a requesting entity by an authenticating entity comprising:

receiving, by an authenticating entity, a request for data from a requesting entity;

sending, by the authenticating entity to the requesting entity, challenge data in plain text, wherein the challenge data comprises time data based on a current time of a system of the authenticating entity;

receiving, by the authenticating entity from the requesting entity, the challenge data, wherein the received challenge data is encrypted, by a computer processor of the requesting entity;

calculating, by a computer processor, a time difference between when the challenge data is sent to the requesting entity in plain text from the authenticating entity and when the encrypted challenge data is received by the authenticating entity from the requesting entity; and authenticating, by the authenticating entity, the requesting entity by decrypting the received encrypted challenge data and determining that the time difference is less than a predetermined threshold, wherein when the requesting entity requests data, the authenticating entity provides an application and a key for download by the requesting entity, and wherein the challenge data is encrypted by the requesting entity and decrypted by the authenticating entity using the key.

9. The method of claim 8, wherein the requesting entity periodically downloads a new application and a new key from the authenticating entity.

10. The method of claim 9, wherein the challenge data is encrypted by the requesting entity and decrypted by the authenticating entity using the new key.

11. The method of claim 8, wherein the requesting entity is a mobile telecommunications device requesting content to be downloaded.

12. A method for authentication of a requesting entity by an authenticating entity comprising:
- receiving, by an authenticating entity, a request for data from a requesting entity;
- encrypting, by a computer processor of the authenticating entity, challenge data;
- sending, by the authenticating entity to the requesting entity, the encrypted challenge data, wherein the challenge data comprises time data based on a current time of a system of the authenticating entity;
- receiving, by the authenticating entity from the requesting entity, the challenge data in plain text, wherein the received challenge data in plain text is decrypted by the requesting entity, and
- calculating a time difference between when the encrypted challenge data is sent to the requesting entity from the authenticating entity and when the challenge data in plain text is received by the authenticating entity from the requesting entity; and
- authenticating, by the authenticating entity, the requesting entity when the authenticating entity receives the challenge data in plain text and when the time difference is less than a predetermined threshold, wherein when the requesting entity requests data, the authenticating entity provides an application and a key for download by the requesting entity, and wherein the challenge data is encrypted by the authenticating entity and decrypted by the requesting entity using the key.

13. The method of claim 12, wherein the key is used by a plurality of requesting entities to authenticate each of the plurality of requesting entities.

14. The method of claim 12, wherein the requesting entity is a mobile telecommunications device requesting content to be downloaded.

* * * * *